United States Patent
Senoo

Patent Number: 5,311,517
Date of Patent: May 10, 1994

[54] HIGHLY-EFFICIENT TIME-DIVISION DATA MULTIPLEXING APPARATUS

[75] Inventor: Takanori Senoo, Hirakata, Japan

[73] Assignee: Matsushita Electric Industrial Co., Ltd., Tokyo, Japan

[21] Appl. No.: 870,632

[22] Filed: Apr. 20, 1992

[30] Foreign Application Priority Data

Apr. 18, 1991 [JP] Japan .................................. 3-86707

[51] Int. Cl.$^5$ .................................................. H04J 3/16
[52] U.S. Cl. .................................. 370/95.1; 370/112; 307/244
[58] Field of Search ............... 370/112, 94.1, 60, 60.1, 370/94.2, 85.6, 111, 85.11, 84, 95.1; 307/243, 244; 328/153, 154

[56] References Cited

U.S. PATENT DOCUMENTS

| | | | |
|---|---|---|---|
| 4,759,017 | 7/1988 | Allan | 370/85.11 |
| 4,843,606 | 6/1989 | Bux et al. | 370/89 |
| 4,884,264 | 11/1989 | Servel | 370/60 |
| 4,891,805 | 1/1990 | Fallin | 370/95.1 |
| 4,893,306 | 1/1990 | Chao et al. | 370/94.2 |
| 4,916,693 | 4/1990 | Shimada et al. | 370/110.1 |
| 4,939,720 | 7/1990 | Bakka | 370/60 |
| 5,121,383 | 6/1992 | Golestani | 370/60 |
| 5,128,929 | 7/1992 | Kobayashi | 370/94.1 |

FOREIGN PATENT DOCUMENTS

| | | |
|---|---|---|
| 0251587A2 | 1/1988 | European Pat. Off. . |
| 57-83945 | 5/1982 | Japan . |
| 59-2455 | 1/1984 | Japan . |

OTHER PUBLICATIONS

Technology of PCM Communications, Kaneko, Sanpo Publishing Co., 1983, pp. 10–13.

*Primary Examiner*—Benedict V. Safourek
*Assistant Examiner*—Chau T. Nguyen
*Attorney, Agent, or Firm*—Wenderoth, Lind & Ponack

[57] ABSTRACT

A time-division data multiplexing apparatus has first through Nth memories for temporarily storing first through Nth data blocks, and first through Nth address control circuits for controlling the first through Nth memories, respectively. Any nth address control circuit (n=1,2, ..., N) calculates a time period $A_n$ of an nth time slot to be assigned to an nth data block from a data size $M_n$ of the nth data block stored in an nth memory and an available time period, $T_n$ indicated by an available time signal as a time period available for transmission of the nth through Nth data blocks, and controls the nth memory so as to read out data of the nth data block stored in the nth memory for $A_n$ while outputting for $A_n$ an selection signal $S_n$ indicating that the data stored in the nth memory is being read out. A selector coupled to the memories is responsive to the nth selection signal for selectively outputting the nth data block from the nth memory to form a time-division multiplexed data. Any nth address control circuit (n=1, 2, ..., N-1) calculates a difference between $T_n$ and $A_n$, and giving an (n+1)th address control circuit with the difference as a signal indicative of a time period $T_{n+1}$ available for transmission of the (n+1)th through Nth data blocks.

2 Claims, 3 Drawing Sheets

HIGHLY-EFFICIENT TIME-DIVISION DATA MULTIPLEXING APPARATUS

BACKGROUND OF THE INVENTION

1. Field of the Invention

The present invention relates to a data multiplexing apparatus for time-division multiplexing a plurality of kinds of data blocks.

2. Description of the Prior Art

Generally, a conventional time-division data multiplexing apparatus has a circuit arrangement as shown in FIG. 5. This apparatus is shown in "Technology of PCM Communications" by Kaneko, Sanpo Publishing Co., P.11, 1983. The operation of the apparatus will be explained with reference to FIG. 6. As a 4-step rotary switch 7 rotates at a constant speed of one rotation per given period T, first through fourth discrete data blocks are sequentially selected at time intervals of T/4 to form a time-division multiplexed data.

According to such a conventional time-division multiplexing technique, the size of the time slot assigned to each data block is fixed (T/4 in the above case). So, when the data size of each data block is not uniform or varies with time, the rotating period T of the rotary switch must be set so that each time slot can accommodate a data block having a maximum data size. Since such a large time slot is assigned equally to every data block, which has a smaller data size in most cases the amount of unoccupied time will increase. Accordingly, a highly efficient time-division data multiplexing cannot be expected.

SUMMARY OF THE INVENTION

Accordingly, it is an object of the present invention to provide a time-division data multiplexing apparatus capable of varying the size of each time slot according to the data size of each input data block to thereby realize a highly efficient time-division data multiplexing.

To achieve this object, a time-division data multiplexing apparatus according to the present invention comprises: first through Nth memories for temporarily storing first through Nth data blocks, where N is an integer of at least 2; first through Nth address control circuits for controlling said first through Nth memories, respectively, any nth address control circuit of the first through Nth address control circuits, where n=1,2,... , N, comprising means for calculating a time period An of an nth time slot to be assigned to a corresponding nth data block from a data size $M_n$ of the nth data block stored in a corresponding nth memory and an available time period $T_n$ indicated by an available time signal as a time period available for transmission of the nth through Nth data blocks, and means for controlling the nth memory to so as to read out data of the nth data block stored in the nth memory for the time period $A_n$ and for outputting for the time period $A_n$ an selection signal $S_n$ indicating that the nth data block stored in the nth memory is being read out; and a selecting means coupled to the first through Nth memories and responsive to the nth selection signal for selectively outputting the nth data block read out from the nth memory to form a time-division multiplexed data which are composed of the first through Nth data blocks which are respectively assigned to first through Nth time slots. An available time signal indicative a time period available for transmission of the first through Nth data blocks may be externally given to the first address control circuit. Any nth address control circuit of the first through (N-1)th address control circuits includes means for calculating a difference between the available time period $T_n$ available for transmission of the nth through Nth data blocks and the time period $A_n$ of the nth time slot, and giving an (n+1)th address control circuit with the difference as an available time signal indicative of an available time period $T_{n+1}$ available for transmission of the (n+1)th through Nth data blocks.

In this configuration, a length of each time slot assigned to a corresponding data block can be determined according to a data size of the corresponding data block. Accordingly, a highly efficient time-division data multiplexing can be realized.

DESCRIPTION OF THE PREFERRED EMBODIMENTS

Figure 1:
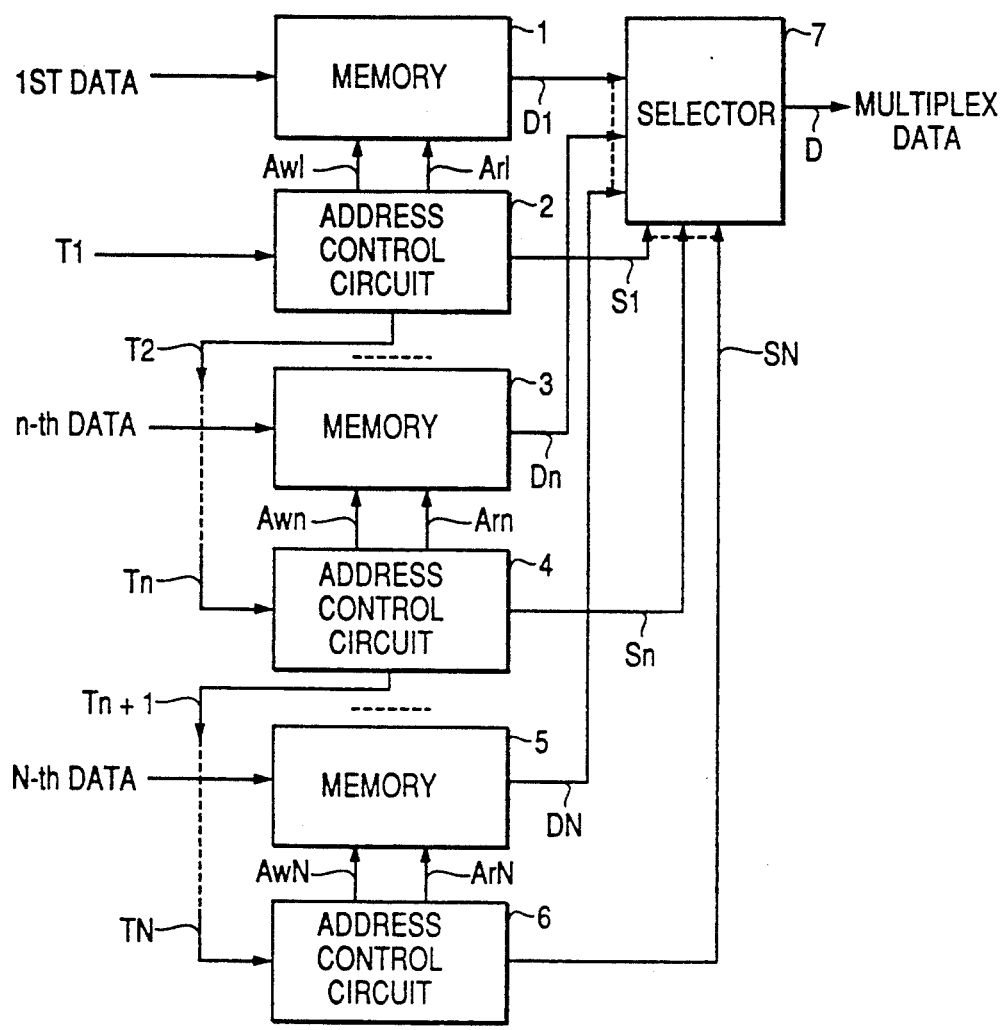
FIG. 1 is a schematic block diagram showing a time-division data multiplexing apparatus as an embodiment of the present invention.
Figure 2:
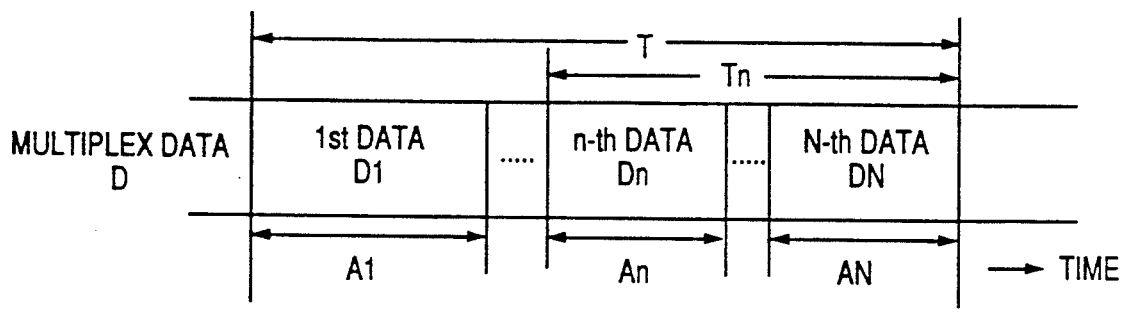
FIG. 2 is a schematic timing chart showing a multiplexed data stream produced by the apparatus shown in FIG. 1.

FIG. 1 is a schematic block diagram showing a time-division data multiplexing apparatus as an embodiment of the present invention, and FIG. 2 is a schematic timing chart showing a multiplexed data stream produced by the apparatus shown in FIG. 1. It is assumed that n input data blocks, first through Nth data blocks, are to be time-division multiplexed. The data transmission rate is assumed to be constant. A quantity of data transmitted in a predetermined time period T is expressed as $Q_T$. A total quantity (total data size) of the first through Nth data blocks is assumed to be $Q_T$.

The input first through Nth data blocks (N is an integer of at least 2) are temporarily stored in first through Nth memories 1, 3 and 5, respectively. The first through Nth memories are controlled by first through Nth address control circuits 2, 4 and 6, respectively. For example, an nth (n=1, 2, .. , N) address control circuit 4 controls the corresponding nth memory 3 by using a read address signal $Ar_n$ and a write address signal $Aw_n$. The nth memory 3 stores the nth input data block.

The first address control circuit 2 receives an available-time signal $T_1$ which is equal to a total time period T available for transmission of the total N input data blocks, and calculates a time period $A_1$ of a time slot to be assigned to the first data block from the time period $T_1$ (here, both an available-time signal and a time period indicated by the signal are denoted by the same reference symbol) and a data size $M_1$ of the first data block stored in the first memory 1. According to the time period $A_1$, the first address control circuit 2 controls the first memory 1 to read out the stored first data block, and at the same outputs a selection signal $S_1$ indicating that the first data block is selected for transmission. A selector 7 selects output data $D_1$ from the first memory 1 as a data block to be transmitted in response to the selection signal $S_1$, and passes therethrough the output data $D_1$ from the first memory 1, i.e., data in the first data block. Further, the first address control circuit 2 calculates a difference between the time period $T_1$ and the time period $A_1$ and generates an available-time signal $T_2$ indicative of the difference. The available-time signal $T_2$ is received by the second address control circuit (not shown in FIG. 1).

Generally, the nth address control circuit 4 receives an available-time signal $T_n$ indicative of a time period available for transmission of the nth through Nth data blocks, and calculates a time period $A_n$ of a time slot to be assigned to the nth data block from the time period $T_n$ and a data size $M_n$ of the nth data block stored in the nth memory 3. According to the time period $A_n$, the nth address control circuit 4 controls the nth memory 3 to read out the stored nth data block, and at the same outputs a selection signal $S_n$ indicating that the nth data block is selected for transmission. A selector 7 selects output data $D_n$ from the nth memory 3 as a data block to be transmitted in response to the selection signal $S_n$, and passes therethrough the output data $D_n$ from the nth memory 1, i.e., data in the nth data block. Further, the nth address control circuit 3 calculates a difference between the time period $T_n$ and the time period $A_n$ and generates an available-time signal $T_{n+1}$ indicative of the difference. The available-time signal $T_{n+1}$ is received by the (n+1)th address control circuit (not shown in FIG. 1). Of course, it is not necessary for the Nth address control circuit 6 to output, an available-time signal because there is no signal block remaining.

Accordingly, the output data from the selector 7 becomes a time-division multiplexed data D in which the first through Nth data blocks are sequentially time-division multiplexed in the predetermined time period T as shown in FIG. 2. Each time slot assigned to a corresponding data block has a time period which is determined depending upon the data size of the corresponding data block. It may be understood that there is no time slot which has an unoccupied portion in which no data exist.

Figure 3:
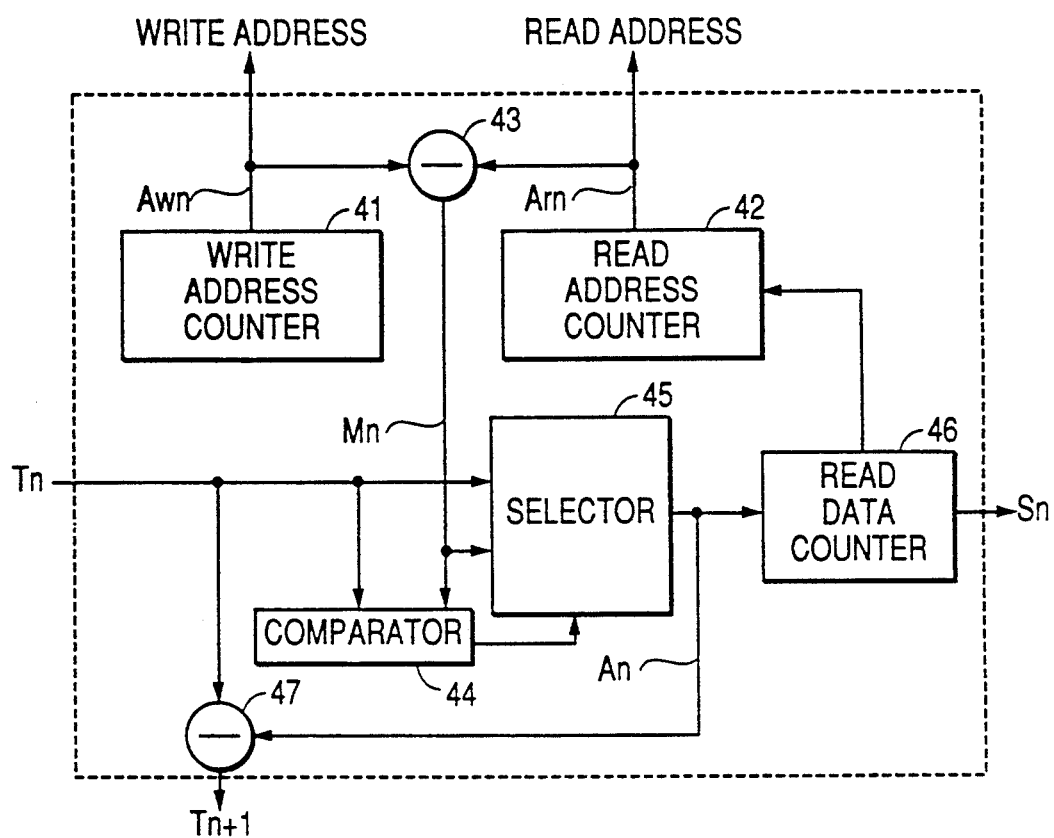
FIG. 3 is a schematic block diagram showing an example of an nth address control circuit (n=1 through N-1) in the apparatus shown in FIG. 1.

FIG. 3 is a schematic block diagram showing an example of an nth address control circuit (n=1, 2, ..., N−1) address control circuit shown in FIG. 1. Here, each of the first through Nth memories in FIG. 1 is assumed to be a first-in first-out memory (FIFO memory, hereafter). A write address counter 41 and a read address counter 42 respectively generate a write address $Aw_n$ and a read address $Ar_n$ of the nth FIFO memory. The data size of the nth data block stored in the nth FIFO memory 1 or 3 can be represented by a difference between the read address $Ar_n$ and write address $Aw_n$. A subtractor 43 calculates the difference between the read address $Ar_n$ and write address $Aw_n$ and outputs a difference signal $M_n$ indicative of the difference, or the data size of the nth data block stored in the nth FIFO memory. A comparator 44 compares the difference signal $M_n$ with the available-time signal $T_n$ indicative of the time period $T_n$ assigned for transmission of the nth through Nth data blocks and outputs a signal indicating which of $M_n$ and $T_n$ is smaller than the other. A selector 45 receives the difference signal $M_n$ and the available-time signal $T_n$ and selects as an output signal $A_n$ thereof a smaller one of the two signals according to the output signal of the comparator 44. That is, the selector 45 outputs the difference signal $M_n$ when $M_n$ is smaller than $T_n$ and the available-time signal $T_n$ when $T_n$ is smaller than $M_n$. The output signal $A_n$ of the selector 45 indicates a time period An of the time slot assigned to the nth data block. A read data counter 46 is responsive to the output signal $A_n$ of the selector 45 for activating the read address counter 42 for the time period $A_n$ so as to read out the data of the data block $D_n$ stored in the nth memory 1 or 3, and for generating the selection signal $S_n$ for the time period $A_n$. That is, the selection signal $S_n$ indicates that the nth data block is being selected as the data block to be transmitted. The selector 7 shown in FIG. 1 passes therethrough the output data $D_n$ from the nth memory 3 in response to the selection signal $S_n$ to allocate the data $D_n$ of the nth data block to the nth time slot having the time period $A_n$.

The nth (n=1, 2, ..., N−1) address control circuit shown in FIG. 3 further has a subtractor 47 which substracts the output signal $A_n$ of the selector 45 from the available-time signal $T_n$ to obtain a new available-time signal $T_{n+1}$ indicative of a time period $T_{n+1}$ available for transmission of the subsequent (n+1)th through Nth data blocks. The new available-time signal $T_{n+1}$ is sent to the selector (corresponding to the selector 45) of the (n+1)th address control circuit.

Figure 4:
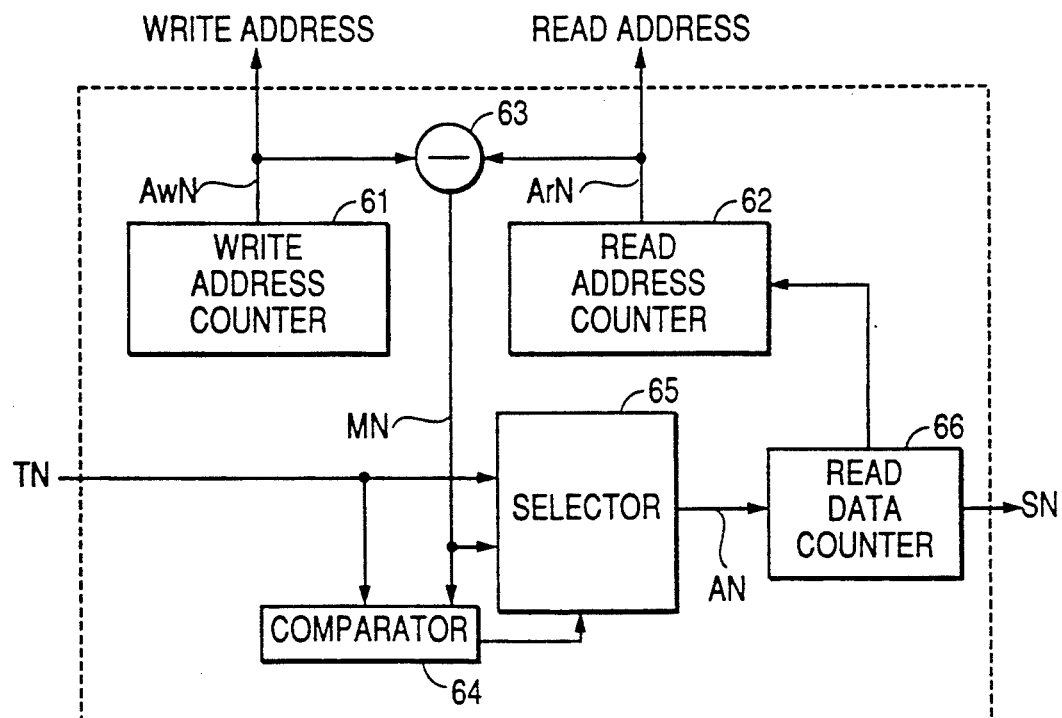
FIG. 4 is a schematic block diagram showing an example of an Nth address control circuit in the apparatus shown in FIG. 1.
Figure 5:
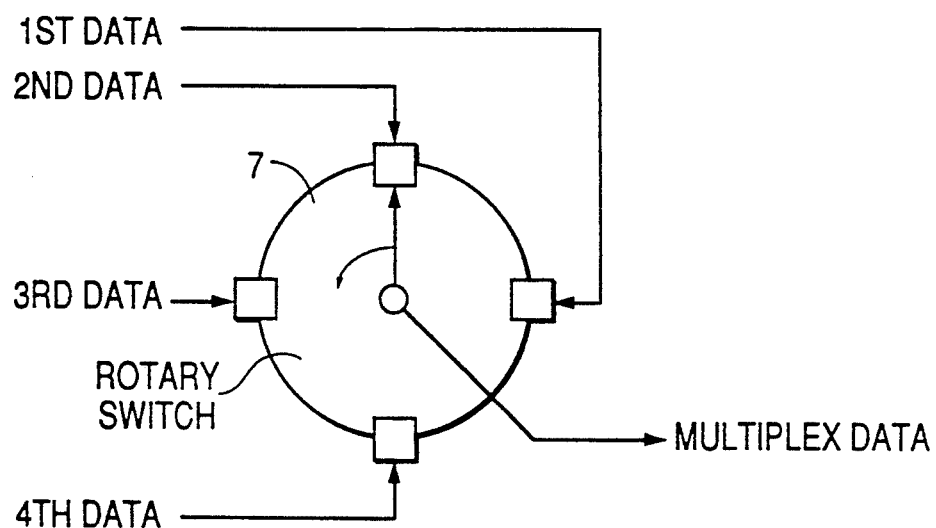
FIG. 5 is a schematic block diagram showing a conventional time-division data multiplexing apparatus.
Figure 6:
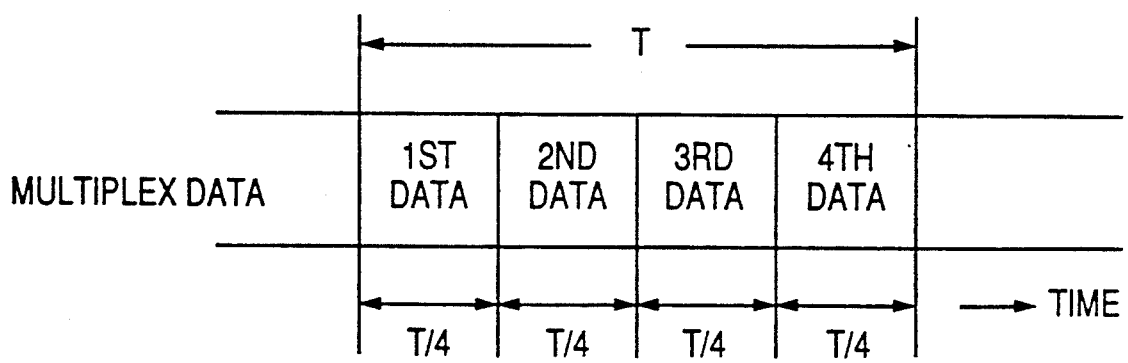
FIG. 6 is a schematic timing chart showing a multiplexed data stream produced by the conventional apparatus shown in FIG. 5.

FIG. 4 is a schematic block diagram showing an example of the Nth address control circuit in the apparatus shown in FIG. 1. The only difference in configuration between the Nth address control circuit shown in FIG. 4 and each of the first through (N−1)th address control circuits shown in FIG. 3 is that the Nth address control circuit of FIG. 4 does not have a subtractor corresponding to the subtractor 47 shown in FIG. 3.

Referring to FIG. 4, a write address counter 61 and a read address counter 62 respectively generate a write address $Aw_N$ and a read address $Ar_N$ of the Nth FIFO memory 5. The data size of the Nth data block stored in the Nth FIFO memory can be represented by a difference between the read address $Ar_N$ and write address $Aw_N$. A subtractor 63 calculates the difference between the read address $Ar_N$ and write address $Aw_N$ and outputs a difference signal $M_N$ indicative of the difference, or the data size of the Nth data block stored in the Nth FIFO memory. A comparator 64 compares the difference signal $M_N$ with the available-time signal $T_N$ indicative of the time period $T_N$ assigned for transmission of the Nth data block and outputs a signal indicating which of $M_N$ and $T_N$ is smaller than the other. A selector 65 receives the difference signal $M_N$ and the available-time signal $T_N$ and selects as an output signal $A_N$ thereof a smaller one of the two signals according to the output signal of the comparator 64. That is, the selector 65 outputs the difference signal $M_N$ when $M_N$ is smaller than $T_N$ and the available-time signal $T_N$ when $T_N$ is smaller than $M_N$. The output signal $A_N$ of the selector 65 indicates a time period $A_N$ of the time slot assigned to the Nth data block. A read data counter 66 is responsive to the output signal $A_N$ of the selector 65 for activating the read address counter 62 for the time period $A_N$ so as to read out the data of the data block $D_N$ stored in the Nth memory, and for generating the selection signal $S_N$ for the time period $A_N$. That is, the selection signal indicates that the Nth data block is being selected as the data block to be transmitted. The selector 7 shown in FIG. 1 passes therethrough the output data $D_N$ from the Nth memory 5 in response to the selection signal $S_N$ to allocate the data $D_N$ of the Nth data block to the Nth time slot having the time period $A_N$.

As described above, a time-division data multiplexing apparatus according to the present invention determines a data size of each data block from read and write address of a corresponding memory storing the data block, and decides a length of a time slot to be assigned to the data block from the data size of the data block and an available time for transmission of the data block and succeeding data blocks. Further, the remainder of the available time is assigned to the succeeding data blocks. Accordingly, each time slot is assigned to a corresponding data block according to the data size of the data block so as to perform time-division data multiplexing at high efficiency without causing a last time.

What is claimed is:

1. A time-division data multiplexing apparatus comprising:
   first through Nth memories for temporarily storing first through Nth data blocks, where N is an integer of at least 2;
   first through Nth address control circuits for controlling said firs through Nth memories, respectively, any nth address control circuit of said first through Nth address control circuits, where $n = 1, 2, \ldots, N$, comprising means for calculating a time period $A_n$ of an nth time slot to be assigned to a corresponding nth data block from a data size $M_n$ of the nth data block stored in a corresponding nth memory and an available time period $T_n$ indicated by an available time signal as a time period available for transmission of the nth through Nth data blocks, and means for controlling the nth memory so as to read out data of the nth data block stored in the nth memory for the time period $A_n$ and for outputting for the time period $A_n$ a selection signal $S_n$ indicating that the nth data block stored in the nth memory is being read out; and
   a selecting means coupled to said first through Nth memories and responsive to the selection signal $S_n$ for selectively outputting the nth data block read out from the nth memory to form a time-division multiplexed data which are composed of the fist through Nth data blocks which are respectively assigned to first through Nth time slots,
   wherein any nth address control circuit of first through (N−1) th address control circuits of said first through Nth address control circuits, where $(n = 1, 2, \ldots, N-1)$, includes means for calculating a difference between the available time period $T_n$ and the time period $A_n$ of the nth time slot and for supplying an (n+1)th address control circuit with said difference as an available time signal indicative of an available time period $T_{n+1}$ available for transmission of the (n+1)th through Nth data blocks.

2. The time division data multiplexing apparatus according to claim 1, wherein said nth address control circuit of the first through (N−1) th address control circuits comprises:
   a write address counter and a read address counter for respectively $Ar_n$ of the nth memory;
   a subtractor for calculating a difference between the read address $Ar_n$ and write address $Aw_n$ and outputting a difference signal indicative of the difference, which is the data size $M_n$ of the nth data block stored in the nth memory;
   a comparator for comparing the difference signal with the available-time signal indicative of the time period $T_n$ assigned for transmission of the nth through Nth data blocks and outputting a signal indicating which of $M_n$ and $T_n$ is smaller than the other;
   a selector receiving the difference signal $M_n$ and the available-time signal $T_n$ and selecting as an output signal thereof a smaller one of the two signals according to the output signal of the comparator, the output signal of the selector being indicative of the time period A, of the time slot assigned to the nth data block;
   a read data counter responsive to the output signal of the selector for activating the read address counter for the time period $A_n$ so as to read out the data of the nth data block stored in the nth memory, and for generating the selection signal $S_n$ for the time period $A_n$; and
   a subtractor for subtracting the output signal of the selector from the available-time signal indicative of the time period $T_n$ to obtain a new available-time signal indicative of the time period $T_{n+1}$, the new available-time signal being sent to the (n+1)th address control circuit.

* * * * *